United States Patent [19]

Sweeney et al.

[11] Patent Number: 4,528,674
[45] Date of Patent: Jul. 9, 1985

[54] METHOD AND APPARATUS FOR BASEBAND GENERATION OF A SPREAD SPECTRUM REFERENCE SIGNAL FOR USE IN AN LMS ADAPTIVE ARRAY PROCESSOR

[75] Inventors: Dennis A. Sweeney; David E. Sanders, both of St. Petersburg, Fla.

[73] Assignee: E-Systems, Inc., Dallas, Tex.

[21] Appl. No.: 525,295

[22] Filed: Aug. 22, 1983

[51] Int. Cl.³ .................... H04B 1/10; H04B 15/00
[52] U.S. Cl. .......................................... 375/1; 375/96; 375/102; 375/120; 343/378; 343/383
[58] Field of Search ................. 375/1, 34, 58, 96, 102, 375/115, 119, 120; 343/367, 372, 378, 379, 383

[56] References Cited

U.S. PATENT DOCUMENTS

| | | | |
|---|---|---|---|
| 4,017,798 | 4/1977 | Gordy et al. | 375/1 |
| 4,079,380 | 3/1978 | Esry et al. | 343/368 |
| 4,122,393 | 10/1978 | Gordy et al. | 375/96 |
| 4,156,877 | 5/1979 | Piesinger | 375/1 |
| 4,161,733 | 7/1979 | Piesinger | 375/1 |
| 4,203,071 | 5/1980 | Bowles et al. | 375/1 |
| 4,361,891 | 11/1982 | Lobenstein et al. | 375/1 |

Primary Examiner—Marc E. Bookbinder
Assistant Examiner—Raymond C. Glenny
Attorney, Agent, or Firm—Albert M. Crowder, Jr.

[57] ABSTRACT

A method and apparatus for baseband generation of a spread spectrum reference signal for an LMS adaptive array processor is provided. An IF summed, weighted spread spectrum signal is output from the processor and translated to baseband to produce an I (in-phase) channel spread baseband signal and a Q channel (quadrature-phase) spread baseband signal. A baseband correlator receives the I channel and Q channel baseband signals and delayed versions of in-phase and quadrature-phase PN signals and produces despread I channel and Q channel baseband output signals. A baseband linear spreader receives the despread I channel and Q channel baseband output signals and the in-phase and quadrature-phase PN signals and produces respread I channel and Q channel baseband signals. A baseband modulator modulates the respread I channel and Q channel baseband signals with a phase-shifted local oscillator to produce the reference signal. The reference signal is subtracted from the spread spectrum signal to produce an error signal consisting essentially of the undesired signal components in the spread spectrum signal. The adaptive array processor minimizes the mean-square value of the error signal to minimize these undesired signal components. If desired, multi-channel capability can be provided by a summer for summing respread I channel and Q channel baseband signals from a plurality of channels in the spread spectrum communication system.

16 Claims, 4 Drawing Figures

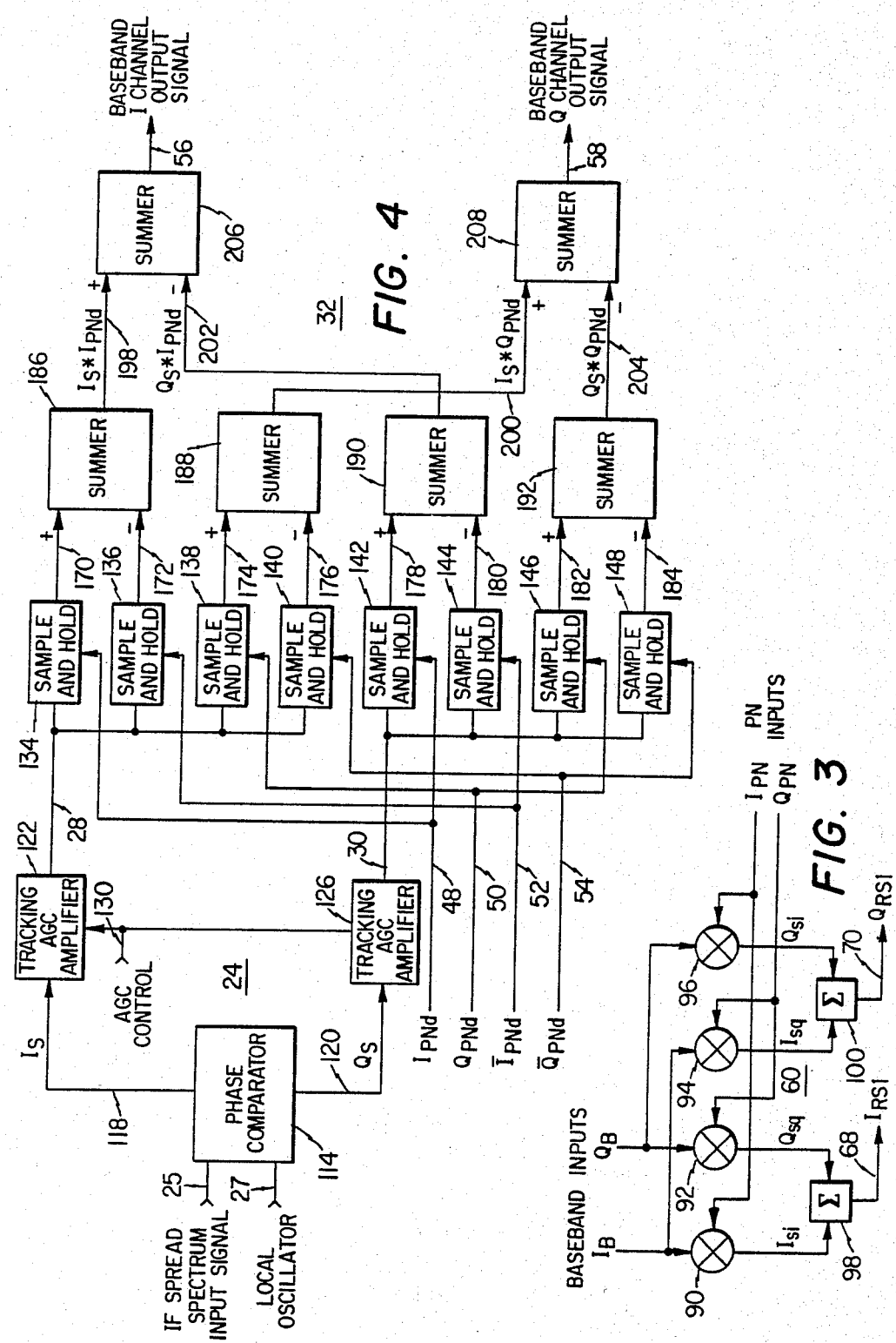

METHOD AND APPARATUS FOR BASEBAND GENERATION OF A SPREAD SPECTRUM REFERENCE SIGNAL FOR USE IN AN LMS ADAPTIVE ARRAY PROCESSOR

TECHNICAL FIELD

The present invention relates generally to the detection of spread spectrum communication signals and more particularly to the baseband generation of a reference signal for use in an adaptive array antenna processor.

BACKGROUND OF THE INVENTION

An LMS adaptive antenna array advantageously provides automatic tracking of a desired signal and nulling of directional interference. Such arrays, however, are generally incompatible with practical communication systems because the array "weights" are random processes which modulate the desired signal. Notwithstanding this problem, adaptive arrays have been utilized in spread spectrum systems. However, since most spread spectrum systems correlate the received spread signal at RF, the reference signal for controlling the adaptive array weights is generated by costly RF components. This generation is necessarily an expensive, space consuming technique, especially when multiple channels are involved.

Therefore, although the use of an adaptive array in a spread spectrum system could provide substantial interference suppression, such a combination has proven to be prohibitively expensive due to the requirement of RF generation of the reference signal. A baseband approach to the generation of the adaptive array reference signal is thus desirable.

SUMMARY OF THE INVENTION

The present invention provides a baseband reference recovery loop for use with an LMS adaptive array processor in a spread spectrum communication system. The reference recovery loop baseband generates a reference signal which is utilized by the adaptive array processor to minimize the undesired signal components in the spread spectrum signal. To provide baseband generation of the reference signal, the reference recovery loop includes a down converter for translating the IF spread spectrum signal to baseband to produce an I (in-phase) channel baseband signal and a Q (quadrature-phase) channel baseband signal. The loop also includes a baseband correlator for correlating the I channel and Q channel baseband signals with delayed in-phase and quadrature-phase pseudonoise (PN) signals to produce despread I channel and Q channel baseband output signals. The despread baseband output signals are then respread by the in-phase and quadrature-phase PN signals in a baseband linear spreader to produce respread I channel and Q channel baseband signals. The loop includes a baseband modulator which modulates the respread I channel and Q channel baseband signals to produce the reference signal. The reference signal is then subtracted from the spread spectrum signal to produce an error signal consisting essentially of the undesired signal components in the spread spectrum signal. The adaptive array processor minimizes the mean-square value of the error signal to minimize these undesired signal components.

If desired, multi-channel capability can be provided by a summer for summing respread I channel and Q channel baseband signals from a plurality of channels in the spread spectrum communication system.

BRIEF DESCRIPTION OF THE DRAWINGS

For a more complete understanding of the present invention and the advantages thereof, reference is now made to the following Description taken in conjunction with the accompanying Drawings in which:

FIG. 3 is a schematic diagram of the baseband linear spreader shown in FIG. 2.

FIG. 4 is a block diagram showing the structure of the baseband down converter and baseband correlator of the baseband reference recovery loop of FIG. 2.

DETAILED DESCRIPTION

Figure 1:
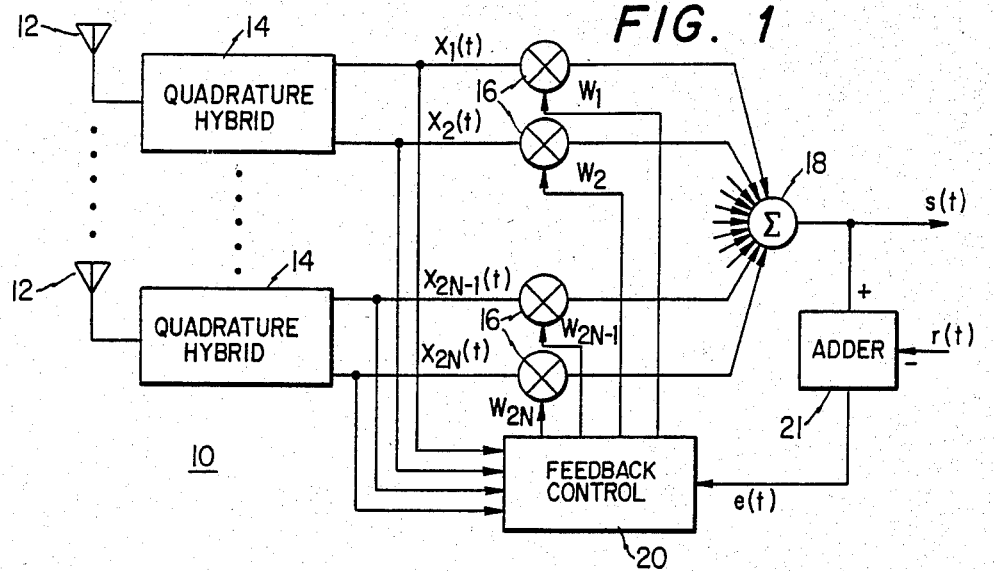
FIG. 1 is a block diagram illustrating a conventional LMS adaptive array processor.

Referring now to the drawings in which like reference characters designate like or corresponding parts throughout the several views, FIG. 1 shows a block diagram of a conventional LMS adaptive array processor 10. The adaptive array processor is connected to a plurality of antenna elements 12, each of which is connected to a quadrature hybrid 14 that splits the signal from the respective antenna element 12 into quadrature components $x_i(t)$. Each component $x_i(t)$ is multiplied by a weight $w_i$ in the multipliers 16, the outputs of which are then summed by summer 18 to produce a summed, weighted array output s(t). The value of the weights $w_i$ are controlled by a feedback control circuit 20 that minimizes the mean-square value of an error signal e(t) derived from an adder 21. The error signal e(t) is the difference between the array output s(t) and a locally RF generated reference signal r(t). In operation, the feedback control circuit 20 forms product signals from the error signal e(t) and the channel signals $X_i(t)$. These product signals are integrated to form the weights $w_i$. The adaptive array processor 10 of FIG. 1 advantageously provides automatic beam tracking of a desired signal and nulling of directional interference.

The performance of the LMS adaptive array processor of FIG. 1 depends on the reference signal r(t). In particular, the array typically receives a signal having desired and undesired signal components, i.e., thermal noise and directional inteference. If the reference signal r(t) is a perfect negative replica of the desired signal, then the error signal e(t) consists entirely of undesired signal components. As the adaptive array processor minimizes the mean-square value of the error signal, the total interference and thermal noise power in the array output is correspondingly minimized. Therefore, the adaptive array processor matches the desired signal to the reference signal to enhance the overall signal-to-interference ratio of the desired signal.

The adaptive array of FIG. 1, however, is generally incompatible with practical communication systems because the array weights $w_i$ are random processes which modulate the desired signal. It has been shown, however, that the adaptive array can be utilized in a communication system if a suitable reference signal is obtained. More specifically, the interference components in the reference signal must be uncorrelated with those at the array output. As is well known in the prior art, a spread spectrum signal may be formed by phase modulating a narrowband signal by a pseudonoise (PN) code sequence. If the spread spectrum receiver includes a signal processing recovery loop for generating the reference signal r(t), and the desired signal passes through this loop relatively unchanged, then the interference components in the reference signal will be highly uncorrelated with those at the array output. This lack of correlation is due to the interference signal not having the proper PN code modulation. However, since most spread spectrum systems correlate the received spread signal at RF, the reference signal for controlling the adaptive array processor is generated by costly RF components. Therefore, although the use of an adaptive array in a spread spectrum system could provide substantial interference suppression, such a combination is prohibitively expensive, especially when multiple channels are involved.

Figure 2:
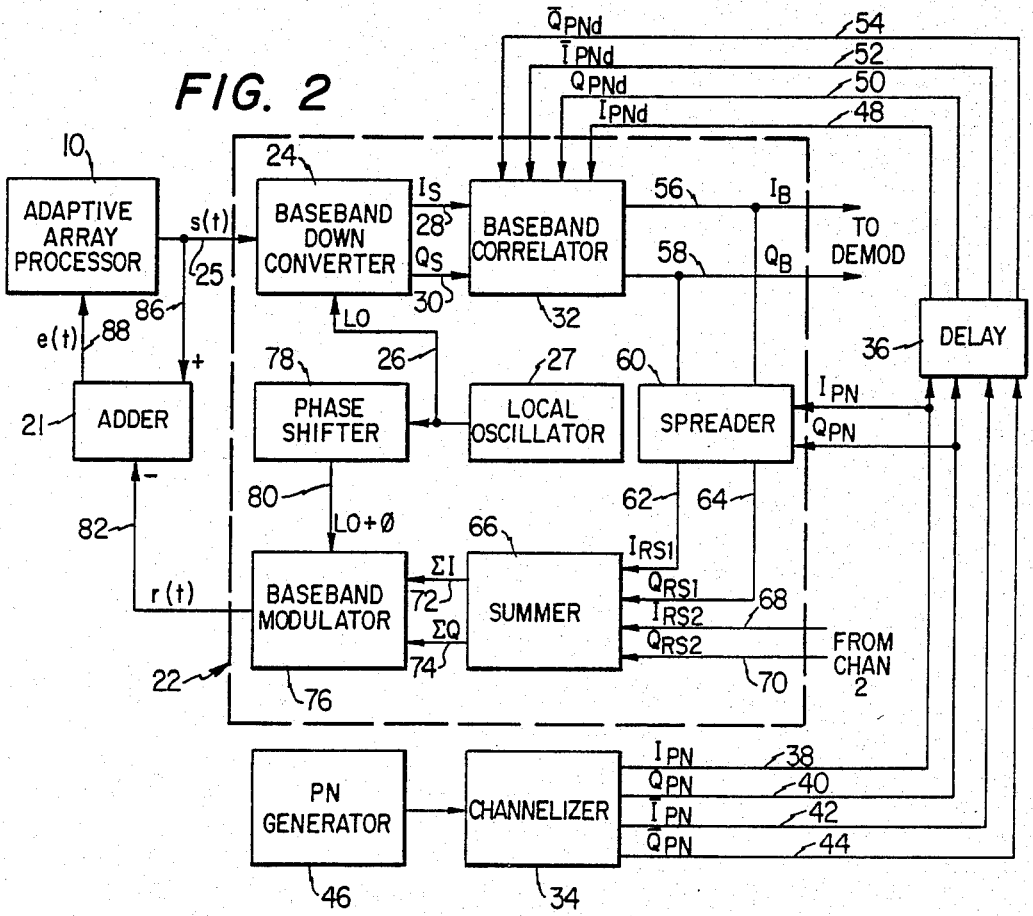
FIG. 2 is a block diagram illustrating the baseband reference recovery loop of the present invention for baseband generation of the adaptive array processor reference signal.

A baseband approach to the generation of the adaptive array reference signal is therefore provided by the circuit shown in FIG. 2. In particular, a baseband reference recovery loop designated generally by the numeral 22 is connected to receive the IF summed, weighted spread spectrum signal s(t) from the adaptive array processor 10. The baseband reference recovery loop 22 includes a baseband down converter 24 which receives the IF spread spectrum signal s(t) via line 25 and a local oscillator signal LO via line 26 from a local oscillator 27. The baseband down coverter 24 provides a phase comparison between the IF spread spectrum signal and the local oscillator signal to produce a difference I channel (in-phase) spread baseband signal designated $I_S$ on line 28, and a difference Q channel (quadrature-phase) spread baseband signal designated $Q_S$ on a line 30.

The I channel and Q channel spread baseband signals are applied via lines 28 and 30 to a baseband correlator 32 which also receives four signals produced by a channelizer 34 and delayed by a delay circuit 36. The four signals produced at the output of the channelizer 34 are transmitted via lines 38, 40, 42 and 44. In particular, an in-phase PN signal $I_{PN}$ is produced at line 38. The logical inverse of the in-phase PN signal, $\bar{I}_{PN}$, is produced at line 42. A quadrature phase PN signal $Q_{PN}$ is produced at line 40. The logical inverse of the quadrature phase PN signal, $\bar{Q}_{PN}$, is produced at line 44. The channelizer 34 functions as a two-phase to four-phase converter for a local PN code signal supplied by a PN generator 46. The in-phase and quadrature-phase PN signals, and their inverses, are supplied via lines 38, 40, 42 and 44 to the delay circuit 36, where these signals are delayed for a predetermined time period. The output signals from the delay circuit 36, designated by the further subscript "d", are supplied via lines 48, 50, 52 and 54 to the baseband correlator 32.

The baseband correlator 32 filters out most of the undesired interference and produces despread baseband I channel and Q channel output signals, designated $I_B$ and $Q_B$, on lines 56 and 58. As seen in FIG. 2, the baseband I channel and Q channel output signals are then supplied via lines 56 and 58 to a demodulator circuit (not shown) which recovers the original narrowband information. These signals are also utilized by the baseband reference recovery loop 22 to generate the reference signal r(t) for the adaptive array processor 10. In particular, the despread baseband I channel and Q channel output signals are supplied to a linear baseband spreader 60, which also receives the in-phase and quadrature-phase PN signals, $I_{PN}$ and $Q_{PN}$, from lines 38 and 40. The spreader 60 multiplies each of the baseband input signals by each of the PN inputs and sums them together to produce respread I channel and Q channel baseband signals, designated $I_{RSI}$ and $Q_{RSI}$, on lines 62 and 64. The respread I channel and Q channel baseband signals are summed with corresponding respread baseband signals from other channels in summer 66. For example, the respread I channel and Q channel baseband signals from a second channel in a multi-channel communications link are provided over lines 68 and 70 to the summer 66. Any number of channel inputs may be applied to the summer 66 which forms combined output respread baseband signals I and Q on lines 72 and 74.

A baseband modulator 76 receives the combined respread baseband output signals I and Q from the summer 66 and a phase shifted version of the local oscillator signal LO from the phase shifter 78 via line 80. The baseband modulator 76 produces the IF reference signal r(t) which is supplied over line 82 to the adder 21. The adder 21 also receives a sample of the IF summed, weighted spread spectrum signal s(t) via line 86. The reference signal r(t) and the sample of the spread spectrum signal s(t) are subtracted by the adder 21 to produce an error signal e(t), which is supplied via line 88 to control the adaptive array processor 10.

Operation of the baseband reference recovery loop 22 is now described in reference to FIG. 2. The purpose of the circuit 22 is to baseband generate the reference signal r(t) to obviate expensive RF filters, modulators and other RF components. The performance of the adaptive array is controlled by the signal utilized for the reference signal r(t). If the reference signal r(t) is a perfect negative replica of the desired signal, the error signal e(t) consists essentially of thermal noise and interference components. By minimizing the mean-square value of the error signal, the total interference and thermal noise power in the array output is likewise minimized. In operation of the circuit of FIG. 2, the baseband reference recovery loop 22 is first calibrated to provide that the reference signal r(t) is a negative replica of the desired signal. In particular, the phase shifter 78 is adjusted such that the phase difference between the spread spectrum signal s(t) and the reference signal r(t) is 180°. The delay provided by the delay circuit 36 on the output of the channelizer 34 is then adjusted so that the PN codes on the spread spectrum signal and the reference signal r(t) are exactly matched. When these two adjustments are made and the adaptive array processor 10 varies the gain on the spread spectrum signal to match the amplitude of the reference signal, then the error signal e(t) from the adder 21 consists essentially of undesired signals, i.e., thermal noise and directional interference. By minimizing the mean-square value of the error signal, the adaptive array processor 10 minimizes the total inteference and thermal noise power in the array output.

The baseband reference recovery loop 22 of FIG. 2 automatically compensates for differences in frequency between the incoming IF spread spectrum signal s(t) and the local oscillator signal LO. In particular, the down conversion despread process performed by the baseband down converter 24 and the baseband correlator 32 will result in a "beat note" equivalent to this frequency difference. This beat note is present as an error component in the despread I channel and Q channel baseband output signals on lines 56 and 58. This error component, when respread and modulated by the spreader 60 and the baseband modulator 76, will result in a frequency offsetting of the reference signal r(t). More specifically, the error component present on the baseband outputs is carried through the entire baseband reference recovery loop 22 and thus forces the local oscillator to line up exactly with the frequency of the incoming spread signal s(t).

It can therefore be seen that the present invention provides a baseband reference recovery loop for interfacing an adaptive array processor with a spread spectrum communication system. Adaptive array processors and spread spectrum modems can individually provide a certain amount of jamming protection but prior art attempts to combine these two techniques have proven difficult due to the requirement of RF generation of the reference signal. The present invention ameliorates this problem by providing baseband generation of the reference signal to be used by the adaptive array processor. Utilizing this baseband approach, costly RF components are not required. Further, the performance of the overall system, i.e., the signal-to-interference ratio at the array output, is much greater than the sum of the signal-to-interference ratios produced by the individual adaptive array processor and the spread spectrum system. Moreover, the use of the baseband linear spreader 60 enables the summing of several baseband channels before modulation by the baseband modulator 76. Therefore, the baseband reference recovery loop 22 requires only one modulator for a multi-channel communications link. Finally, since the reference signal is baseband generated, the present invention is also more compatible with large scale integration processes.

The baseband linear spreader 60 of FIG. 2 is shown in detail in FIG. 3. The spreader 60 comprises multipliers 90, 92, 94 and 96, and summers 98 and 100. Referring to FIG. 3, the despread I channel baseband output signal $I_B$ is applied to one input of multipliers 90 and 94. Similarly, the despread Q channel baseband output signal $Q_B$ is applied to multipliers 92 and 96. The in-phase PN signal $I_{PN}$ is applied to the second input of multipliers 90 and 96. The quadrature-phase PN signal $Q_{PN}$ is applied to the second input of multipliers 92 and 94. It can therefore be seen that the baseband linear spreader 60 multiplies each of the baseband inputs by each of the PN inputs in the multipliers 90, 92, 94 and 96. The outputs $I_{si}$ and $Q_{sq}$ from multipliers 90 and 92 are summed by summer 98 to produce the respread I channel baseband signal $I_{RSI}$. Similarly, the outputs $I_{sq}$ and $Q_{si}$ from multipliers 94 and 96 are summed by summer 100 to produce the respread Q channel baseband signal $Q_{RSI}$. As noted with respect to FIG. 2, the respread I and Q channel baseband signals are supplied via line 68 and 70 to summer 66 where the signals are summed with respread baseband signals from other channels in the multi-channel communications link.

Referring now to FIG. 4, the baseband down converter 24 and the baseband correlator 32 of FIG. 2 will now be described in detail. These components of the reference recovery loop have been described in U.S. Pat. No. 4,484,335 entitled, "Method and Apparatus for Despreading a Spread Spectrum Signal at Baseband," to Mosley, et al. With reference to FIG. 4, the baseband down converter 24 comprises a phase comparator 114 and tracking AGC amplifiers 122 and 126. The phase comparator receives the IF spread spectrum input signal s(t) via the line 25. The local oscillator signal LO is also input via the line 27 to the phase comparator 114.

The spread IF input signal is phase compared (mixed) with the local oscillator signal to produce a difference I channel (in-phase) spread baseband signal designated $I_S$ at a line 118. The phase comparator 114 also produces a 90° phase offset local oscillator signal which is phase compared to the spread IF input signal to produce the difference Q channel (quadrature-phase) spread baseband signal designated $Q_S$ at a line 120.

Signal $I_S$ is passed through the tracking AGC amplifier 122 to the line 28. The signal $Q_S$ is passed through the tracking AGC amplifier 126 to the line 30. An AGC control signal is input through a line 130 to regulate the amplitude of the signals at lines 28 and 30. The AGC control signal is produced by an amplitude monitor (not shown) which monitors the amplitude of the baseband I channel and Q channel signals produced by the baseband correlator 32. The amplifiers 122 and 126 are matched for tracking such that the phase and amplitude of the signals $I_S$ and $Q_S$ are balanced.

The baseband correlator 32 includes a group of eight sample and hold circuits which are labeled 134, 136, 138, 140, 142, 144, 146 and 148. The $I_S$ signal at line 28 is provided as the input to each of the sample and hold circuits 134, 136, 138 and 140. The $Q_S$ signal at line 30 is provided as the input to the sample and hold circuits 142, 144, 146 and 148. The signal $I_{PNd}$ at line 48 is provided to the control inputs of sample and hold circuits 134 and 142. The signal $\bar{I}_{PNd}$ at line 52 is provided to the control inputs of sample and hold circuits 136 and 144. Similarly, the signal $Q_{PNd}$ at line 50 is provided to the control inputs of sample and hold circuits 138 and 146. The signal $\bar{Q}_{PNd}$ at line 54 is provided to the control inputs of sample and hold circuits 140 and 148.

The outputs of sample and hold circuits 134–148 are transmitted respectively through lines 170, 172, 174, 176, 178, 180, 182 and 184. Lines 170 and 172 provide inputs to a summer 186. The output of sample and hold circuit 136 is the negative input to the summer 186. The lines 174 and 176 provide inputs to a summer 188. The output of sample and hold circuit 140 is the negative input to the summer 188. Lines 178 and 180 provide inputs to summer 190. The output of sample and hold circuit 144 is the negative input to the summer 190. Lines 182 and 184 provide inputs to a summer 192. The output of sample and hold circuit 148 provides the negative input to the summer 192.

The combination of the sample and hold circuits 134 and 136 together with the summer 186 comprises a first double balance multiplier which produces a first product signal shown as $I_S*I_{PNd}$ at line 198. The sample and hold circuits 138 and 140 together with the summer 188 comprise a second double balance multiplier which produces a second product signal designated as $I_S*Q_{PNd}$ at line 200. Sample and hold circuits 142 and 144 together with the summer 190 comprises a third double balance multiplier which produces a third product signal designated as $Q_S*I_{PNd}$ at line 202. The combination of sample and hold circuits 146 and 148 together with the summer 192 comprise a fourth double balance multiplier for producing a fourth product signal designated as $Q_S*Q_{PNd}$ at a line 204.

The lines 198 and 202 provide inputs to a summer 206 with the line 202 comprising the negative input thereof. Similarly, the lines 200 and 204 provide inputs to a summer 208 with the line 204 comprising the negative input thereof. Summer 206 receives the product signals from summer 186 and 190 and produces therefrom the baseband I channel output signal $I_B$ at the line 56. The summer 208 receives the product signals from summers 188 and 192 and produces therefrom the baseband Q channel output signal $Q_B$ at the line 58. The baseband I and Q channel output signals are despread, i.e., correlated to remove the original PN code sequence.

The other elements of the reference recovery loop 22 of FIG. 2 are also known in the prior art. For example, the delay circuit 36 may comprise a random access memory into which the in-phase and quadrature-phase PN signals are read. The predetermined delay provided by the delay circuit 36 can be effected by reading and writing these signals at different rates. The channelizer 34 for converting the local two-phase PN signal into a four-phase signal is also well known in the prior art. This circuit is described in detail in the above-referenced patent application. Finally, the baseband modulator 76 of FIG. 2 may, in the preferred embodiment of the invention, be of the type described in U.S. Pat. No. 4,499,585, entitled "Method and Apparatus for Producing a Spread Spectrum Modulating Signal," to Mosley, et al.

The present invention therefore provides a method and apparatus for baseband generation of a reference signal for an LMS adaptive array processor. According to the invention, the processor provides an IF summed, weighted spread spectrum signal which is translated to baseband to produce I and Q channel baseband signals. These baseband signals are correlated with delayed in-phase and quadrature-phase PN signals to produce despread I channel and Q channel baseband output signals. To baseband generate the reference signal, the despread I and Q channel baseband output signals are spread in a baseband linear spreader to produce respread I and Q channel baseband signals which, after summation with respread baseband signals from other channels, are modulated with a phase-shifted local oscillator to produce the reference signal. The adaptive array processor subtracts the reference signal from a sample of the spread spectrum signal to produce an error signal. When the reference recovery loop is properly calibrated, the error signal consists essentially of undesired signal components. The adaptive array processor minimizes these undesired components by minimizing the mean-square value of the error signal. Any frequency difference between the IF spread spectrum signal and the local oscillator signal is automatically compensated for in the reference recovery loop. In particular, the down conversion despread process results in the presence of a "beat note" equivalent to this frequency difference at the baseband output. This beat note, when respread and modulated, will result in a frequency offsetting of the local oscillator that will make it line up exactly with the frequency of the spread spectrum signal.

The baseband generation of the reference signal for the LMS adaptive array processor obviates costly RF components. Further, utilizing this baseband approach, several channels may be combined, yet only one baseband modulator is required. Finally, this technique is also more compatible with large scale integration processes.

Although the invention has been described and illustrated in detail, it is clearly understood the same is by way of illustration and example only and is not to be taken by way of limitation. The spirit and scope of the present invention are to be limited only by the terms of the appended claims.

We claim:

1. A baseband reference recovery loop for use with an LMS adaptive array processor in a spread spectrum communication system, the processor providing an IF summed, weighted spread spectrum signal, comprising:
   means for translating said IF spread spectrum signal to baseband to produce an I (in-phase) channel baseband signal and a Q (quadrature-phase) channel baseband signal, said spread spectrum signal utilizing a pseudonoise (PN) code sequence;
   means for correlating said I channel and Q channel baseband signals with in-phase and quadrature-phase PN signals to produce despread I channel and Q channel baseband output signals;
   means for spreading said despread I channel and Q channel baseband output signals with said in-phase and said quadrature-phase PN signals to produce respread I channel and Q channel baseband signals; and
   means for modulating said respread I channel and Q channel baseband signals with a phase-shifted local oscillator to produce a reference signal, wherein said reference signal is utilized by said adaptive array processor to minimize the undesired signal components in said spread spectrum signal.

2. The baseband reference recovery loop of claim 1 further including means for summing a plurality of respread I channel and Q channel baseband signals from a plurality of other channels in said spread spectrum communication system.

3. The baseband reference recovery loop as described in claim 1 wherein said adaptive array processor includes means for subtracting said reference signal from said spread spectrum signal for producing an error signal consisting essentially of said undesired error components, wherein said adaptive array processor minimizes the mean-square value of said error signal to minimize said undesired signal components.

4. The baseband reference recovery loop as described in claim 1 wherein said means for correlating comprises:
   means for multiplying each of said I and Q channel baseband signals by each of said in-phase and quadrature-phase PN signals to produce first, second, third and fourth product signals,
   means for summing said first and second product signals to produce said I channel baseband signal, and
   means for summing said third and fourth product signals to produce said Q channel baseband signal.

5. The baseband reference recovery loop as described in claim 4 wherein said spread spectrum communication system further includes means for converting a local PN signal comprising said PN code sequence into four-phase signals to form said in-phase PN signal and said quadrature-phase PN signal.

6. The baseband reference recovery loop as described in claim 5 wherein said means for converting also produces the logical inverse signals of said in-phase PN signal and said quadrature-phase PN signal, said logical inverse signals being utilized by said means for multiplying to produce said product signals.

7. The baseband reference recovery loop as described in claim 1 wherein said means for spreading comprises:
   means for multiplying each of said despread I channel and Q channel baseband output signals by said in-phase PN signal and said quadrature-phase PN signal to produce first, second, third and fourth product signals, means for summing said first and second product signals to produce said respread I channel baseband signal, and means for summing said third and fourth product signals to produce said respread Q channel baseband signal.

8. A baseband reference recovery loop for use with an LMS adaptive array processor in a multi-channel spread spectrum communication system, the processor providing an IF summed, weighted spread spectrum signal, comprising:

a phase comparator connected to receive said IF spread spectrum signal having a pseudonoise (PN) code sequence, and a local oscillator signal for producing an I (in-phase) channel spread baseband signal and a Q (quadrature-phase) channel spread baseband signal;

a baseband correlator for receiving said I channel and said Q channel spread baseband signals and delayed in-phase and quadrature-phase PN signals to produce despread I channel and Q channel baseband output signals;

a baseband linear spreader for receiving said despread I channel and Q channel baseband output signals and said in-phase and quadrature-phase PN signals to produce respread I channel and Q channel baseband signals;

a summer for combining said respread I channel and Q channel baseband signals with respread I channel and Q channel baseband signals from other channels in said multi-channel spread spectrum communication system, and a baseband modulator for modulating the combined respread I channel and Q channel baseband signals from said summer with a phase-shifted local oscillator to produce a reference signal, wherein said reference signal is utilized by said adaptive array processor to minimize undesired signal components in said spread spectrum signal.

9. The baseband reference recovery loop as described in claim 8 wherein said adaptive array processor includes an adder for subtracting said reference signal from said spread spectrum signal to produce an error signal which consists essentially of said undesired signal components.

10. A method for baseband generation of a reference signal for use with an LMS adaptive array processor in a spread spectrum communication system, the processor providing an IF summed, weighted spread spectrum signal, comprising the steps of:

translating said IF spread spectrum signal to baseband to produce an I (in-phase) channel baseband signal and a Q (quadrature-phase) channel baseband signal, said spread spectrum signal utilizing a pseudonoise (PN) code sequence, correlating said I channel and Q channel baseband signals with in-phase and quadrature-phase PN signals to produce despread I channel and Q channel baseband output signals, spreading said despread I channel and Q channel baseband output signals with said in-phase and quadrature-phase PN signals to produce respread I channel and Q channel baseband signals, and modulating said respread I channel and Q channel baseband signals with a phase-shifted local oscillator to produce said reference signal.

11. The method for baseband generation of a reference signal as described in claim 10 further including the step of subtracting said reference signal from said spread spectrum signal to produce an error signal.

12. The method for baseband generation of a reference signal as described in claim 11 wherein said adaptive array processor utilizes said error signal to minimize undesired signal components in said spread spectrum signal.

13. The method for baseband generation of a reference signal as described in claim 10 further including the step of summing a plurality of respread I channel and Q channel baseband signals from a plurality of other channels in said spread spectrum communication system.

14. The method for baseband generation of a reference signal as described in claim 10 further including the step of adjusting said phase shift on said local oscillator such that the phase difference between said spread spectrum signal and said reference signal is 180°.

15. The method for baseband generation of a reference signal as described in claim 10 further including the step of matching said PN code sequence on said spread spectrum signal and said reference signal.

16. A method for baseband generation of a reference signal for use with an LMS adaptive array processor in a multi-channel spread spectrum communication system, the processor providing an IF summed, weighted spread spectrum signal, comprising the steps of:

translating said IF spread spectrum signal to baseband to produce an I (in-phase) channel spread baseband signal and a Q channel (quadrature-phase) spread baseband signal, said spread spectrum signal utilizing a pseudonoise (PN) code sequence, correlating said I channel and Q channel spread baseband signals with delayed in-phase and quadrature-phase PN signals to produce despread I channel and Q channel baseband output signals, spreading said despread I channel and Q channel baseband output signals with said in-phase and said quadrature-phase PN signals to produce respread I channel and Q channel baseband signals, summing said respread I channel and said Q channel baseband signals with respread I channel and Q channel baseband signals from other channels of said multi-channel spread spectrum communication system, modulating the combined respread I channel and Q channel baseband signals with a phase-shifted local oscillator to produce a reference signal, and subtracting said reference signal from said spread spectrum signal to produce an error signal, wherein said adaptive array processor utilizes said error signal to minimize undesired signal components in said spread spectrum signal.

* * * * *